(No Model.) 2 Sheets—Sheet 1.
RALPH WILCOX & RANSFORD WILCOX.
MIDDLINGS PURIFIER.
No. 306,567. Patented Oct. 14, 1884.
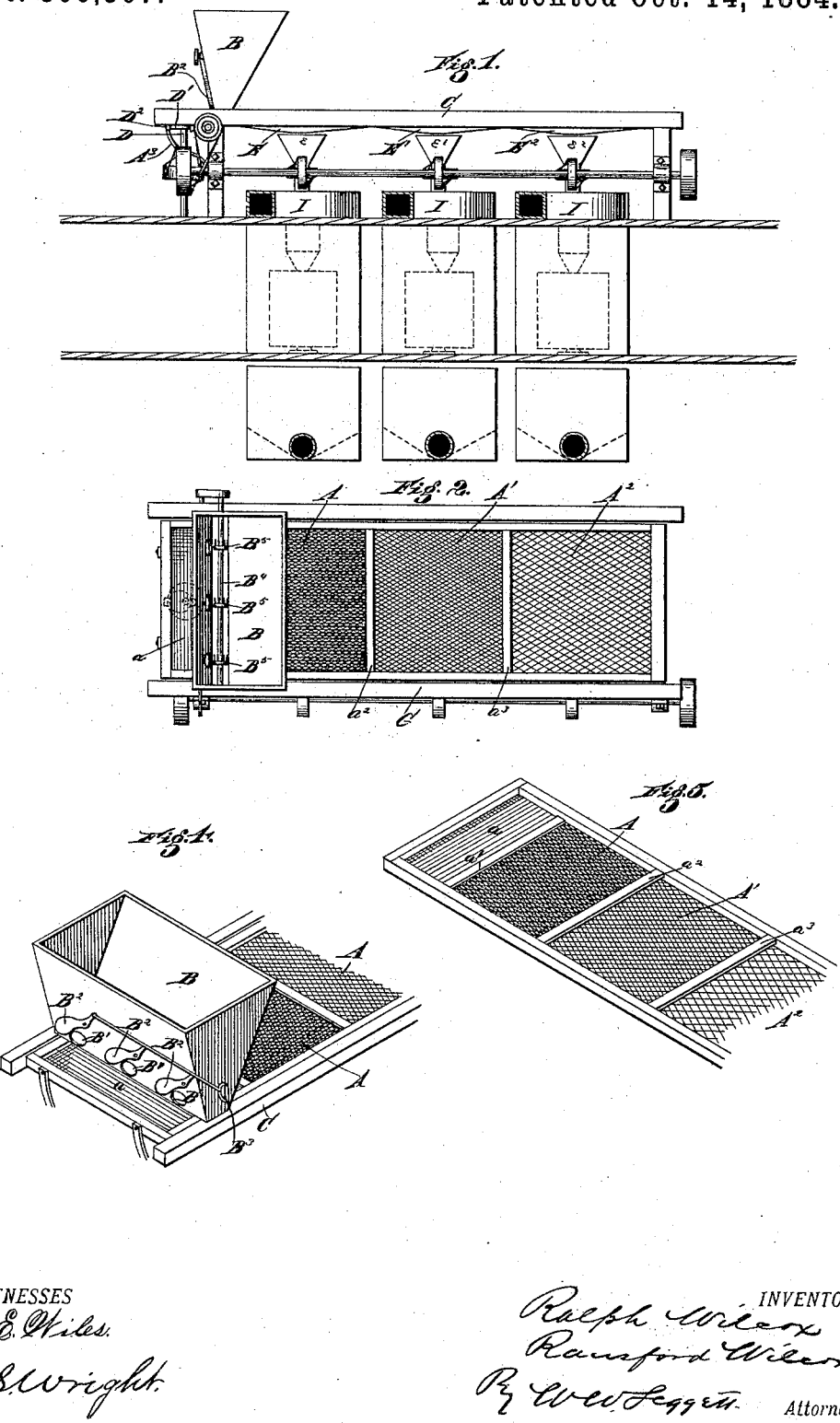
WITNESSES
Jno. E. Wiles.
N. S. Wright.
INVENTORS.
Ralph Wilcox
Ransford Wilcox
By W. W. Leggett, Attorney (No Model.) 2 Sheets—Sheet 2.
RALPH WILCOX & RANSFORD WILCOX.
MIDDLINGS PURIFIER.
No. 306,567. Patented Oct. 14, 1884.
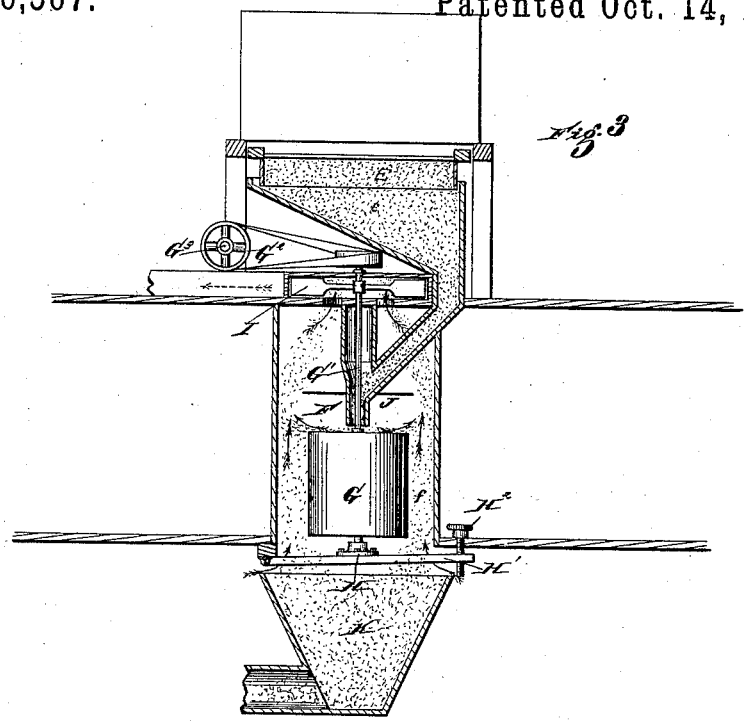

UNITED STATES PATENT OFFICE.

RALPH WILCOX AND RANSFORD WILCOX, OF UTICA, MICHIGAN.

MIDDLINGS-PURIFIER.

SPECIFICATION forming part of Letters Patent No. 306,567, dated October 14, 1884.

Application filed May 13, 1884. (No model.)

*To all whom it may concern:*

Be it known that we, RALPH WILCOX and RANSFORD WILCOX, of Utica, county of Macomb, State of Michigan, have invented a new and useful Improvement in Middlings-Purifiers; and we declare the following to be a full, clear, and exact description of the same, such as will enable others skilled in the art to which it pertains to make and use it, reference being had to the accompanying drawings, which form a part of this specification.

Our invention consists of the combinations of devices and appliances, hereinafter specified, and more particularly pointed out in the claims.

In the drawings, Figure 1 is a side elevation, Fig. 2 a plan view, and Fig. 3 a sectional view, of an apparatus illustrating our invention. Fig. 4 is a separate view of the feeding-hopper mechanism. Fig. 5 is a separate view of sieves.

In carrying out our invention, A A' A² are successive grades of bolting-cloth.

$a$ is a solid section beneath the hopper. $a'$ is a slat or cross-piece over which the mass is caused to pass and so distribute it with substantial uniformity to the bolting-cloth. The succeeding slats $a^2$ $a^3$ we prefer to extend a short distance above the bolting-cloth, so as to permit the products upon the cloth to pass freely from one grade of cloth to another, the different grades being preferably sewed together along their meeting-edges.

B is the feeding-hopper. It may be the terminus of any suitable spouts or conveyers by which the materials are directed to the bolting-cloth.

C is a suitable frame-work for supporting the bolting-frame.

$A^3$ represents flexible supports connected at their lower ends to the frame C, and at their upper ends to the bolting-frame.

D is a shaft bearing an eccentric, D', which revolves within the yoke D², thereby agitating the bolting-frame.

B' represents openings.

B² are valves governed by a suitable handle, B³, for regulating the rate of feed from the hopper onto the bolting-frame.

B⁴ is a shaft bearing agitators B⁵, which insure a steady and uniform feed from the several openings B'.

E E' E² are hoppers or chutes, one of which is located beneath each of the different grades of bolting-cloth to direct each separate grade into its proper purifying device beneath.

We will now proceed to describe one of said purifying devices, they being all similar in construction.

F is a chamber, which we prefer to be cylindrical. Within this chamber is a disk or drum, G, connected with an upright shaft, G'. The shaft is provided with a driving-pulley at its top, and this in turn is geared to a pulley, G², on the counter-shaft G³. The shaft G' is supported in a step, H, at its base. This step is supported upon a lever, H', so as to admit of adjustment up and down by means of an adjusting-screw, H².

I is a suction-fan located at the top of the chamber, adapted to draw air up through the same and discharge it into any suitable settling-chamber. (Not shown.) This fan is also fastened to the shaft G'.

J is a deflector, the object of which is to deflect the air that enters from below and cause it to ascend closely adjacent to the wall of the chamber.

K is a receiver beneath the chamber for collecting the purified middlings, and from this receptacle the middlings may be removed; or they may be conveyed to any other locality by spouts, conveyers, or elevators.

The mass to be purified is fed through the hopper B and the openings B' onto the solid portion $a$ of the screen. The screen being agitated by the eccentric D', causes the mass to distribute with substantial uniformity over the slat $a'$ and onto the bolting-cloth. The grades are successively coarser in the sections A A' A², the finer products passing through the meshes of the section A, a coarser product through the section A', and a still coarser through the section A², these passing through with their corresponding impurities into the chutes or hoppers E E' E² beneath, passing from these into the stationary hoppers $e$ $e'$ $e^2$, and thence down to the purifying device. It here drops onto the drum G. This, revolving at a considerable velocity, distributes the mass into a thin sheet by its centrifugal action, and throws it off from the drum toward the wall of the case F. The fan I creates a draft of air up through the chamber F. This air is deflected to the side of the case by the deflector J, and is thus caused to act upon the middlings along that portion where the material is spread out to its thinnest consistency. The particles here being most widely separated, the air can act upon it very freely, to separate the lighter impurities, permitting the middlings to fall by their superior gravity into the receiver K beneath, while the impurities are drawn into the fan and blown out to any suitable settling-chamber. Should the feed upon the drum G be too rapid, or not sufficiently rapid, the trouble may at once be remedied by adjusting the drum either up or down by means of the adjusting-screw $H^2$. It is thus seen that the suction of the fan is not required to be so great as to separate from the original mass all of its impurities, but each fan is only required to operate upon middlings of a certain grade, and its speed can be so regulated as to effect a perfect separation from this uniform grade of all impurities, without danger of wasting the middlings themselves. The fans in the other chambers, F, and their particular adjustments are all capable of regulation, so as to suit the proper grade in each chamber F.

It will be observed that the drum G is in the form of a cylinder, so as to leave a space of substantially uniform dimensions, $f$, extending down to the bottom of the chamber F. The result is that the suction of the fan creates a uniform draft from the time the draft enters at the base until it is passed up beyond the mass of falling middlings, thus insuring a uniform action upon the mass as it falls down through the draft. By this construction of middlings-purifier we are enabled to recover from the original mass a considerable product of middlings, which, under the usual construction, is wasted or passed off with the refuse; and this is due in a considerable measure to the fact that we do not attempt to effect any separation of impurities until after the material has passed through the bolting-cloths. We are therefore enabled to work upon each grade of middlings mixed with a corresponding grade of impurities, and the difference in the specific gravity of this uniform middlings and its impurities is such that when subjected in the free space within the chamber F to the action of the draft produced by the suction-fan there is effected a very perfect separation of the two.

What we claim is—

1. A middlings-purifier consisting of a bolting-cloth or screen through which middlings of a certain grade and impurities of a corresponding grade pass, a hopper or spout whereby the same are led to a purifying-chamber, a revolving drum located within said chamber for receiving the mass and throwing the same into space, a deflector arranged above said drum, and a suction-fan located above the drum, whereby a draft is produced in a direction contrary to that of the falling middlings, thereby separating the impurities, substantially as described.

2. In a middlings-purifier, a series of graded bolting-cloths adapted to receive and separate into corresponding grades middlings and their corresponding impurities, separate chutes or hoppers for receiving the different grades, separate purifying-chambers for each grade, a revolving drum in each purifying-chamber, and a fan located above each drum, substantially as described.

3. In a middlings-purifier, the chamber F, provided with a revolving disk for receiving the materials to be operated upon, a drum, G, projecting for some distance beneath the revolving disk, whereby the space through which the draft is caused to operate upon the mass is rendered substantially uniform in dimensions, a deflector, J, arranged above the drum, and a suction-fan located above the disk, substantially as described.

4. The combination, with the feeding-hopper having openings $B'$, of valves $B^2$, pivoted upon the hopper, and connected with a handle, $B^3$, a shaft, $B^4$, in the hopper provided with agitators $B^5$, and the screen having a solid portion, $a$, and transverse slat $a'$, substantially as described.

In testimony whereof we sign this specification in the presence of two witnesses.

RALPH WILCOX.
RANSFORD WILCOX.

Witnesses:
JAMES MEYMORE,
FRANK MEYMORE.